(12) United States Patent
Montesello et al.

(10) Patent No.: US 12,545,054 B2
(45) Date of Patent: Feb. 10, 2026

(54) TYRE FOR COMMERCIAL VEHICLE WHEELS

(71) Applicant: Pirelli Tyre S.p.A., Milan (IT)

(72) Inventors: Stefano Montesello, Milan (IT); Carlo Raffaele Elvio Ravizza, Milan (IT); Diego Ettore Speziari, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 35 days.

(21) Appl. No.: 18/566,432

(22) PCT Filed: May 30, 2022

(86) PCT No.: PCT/IB2022/055047
§ 371 (c)(1),
(2) Date: Dec. 1, 2023

(87) PCT Pub. No.: WO2022/259085
PCT Pub. Date: Dec. 15, 2022

(65) Prior Publication Data
US 2024/0359506 A1    Oct. 31, 2024

(30) Foreign Application Priority Data
Jun. 8, 2021    (IT) ............. 102021000014642

(51) Int. Cl.
*B60C 11/11*    (2006.01)
*B60C 11/03*    (2006.01)
(Continued)

(52) U.S. Cl.
CPC ...... *B60C 11/0302* (2013.01); *B60C 11/1236* (2013.01); *B60C 11/1392* (2013.01);
(Continued)

(58) Field of Classification Search
CPC ............. B60C 11/0302; B60C 11/1236; B60C 11/1392; B60C 2011/0344; B60C 2011/0346
See application file for complete search history.

(56) References Cited

U.S. PATENT DOCUMENTS 5,154,783 A * 10/1992 Kuhr ................... B60C 11/0302
D12/567
6,892,775 B1    5/2005 Himuro
(Continued)

FOREIGN PATENT DOCUMENTS

DE    10 2017 203225 A1    8/2018
EP         0 609 195 A1    8/1994
(Continued)

OTHER PUBLICATIONS

Machine translation for Japan 64-036506 (Year: 2025).*
(Continued)

*Primary Examiner* — Steven D Maki
(74) *Attorney, Agent, or Firm* — Finnegan, Henderson, Farabow, Garrett & Dunner, L.L.P.

(57) ABSTRACT

Tyre (1) particularly suitable for applications for commercial vehicles, comprising a tread band (2) which has a plurality of blocks (7, 8) facing each other in pairs and delimited in a circumferential and/or axial direction by a first plurality of main grooves (10, 20) which extend continuously up to the opposite shoulder regions (4, 5) starting from the central region (6), where they are connected to each other and by a second plurality of main grooves (30, 40), also extending from the central region (6) towards the shoulder regions (4, 5), connected to the first main grooves (10, 20) by means of a portion (30b, 40b) preferably tapered in width until it becomes a thin connecting sipe (30c, 40c).

19 Claims, 3 Drawing Sheets

(51) Int. Cl.
*B60C 11/12* (2006.01)
*B60C 11/13* (2006.01)

(52) U.S. Cl.
CPC .............. *B60C 2011/0344* (2013.01); *B60C 2011/0346* (2013.01); *B60C 2011/0374* (2013.01)

(56) References Cited

U.S. PATENT DOCUMENTS

| | | | |
|---|---|---|---|
| 7,814,951 B2 | 10/2010 | Ochi | |
| 2006/0185776 A1 | 8/2006 | Lu | |
| 2014/0230980 A1* | 8/2014 | Guichon | B60C 11/0327 152/209.18 |
| 2018/0072103 A1* | 3/2018 | Vantal | B60C 11/0302 |
| 2018/0093534 A1 | 4/2018 | Ishino | |
| 2019/0263187 A1 | 8/2019 | Furukawa | |
| 2022/0176747 A1 | 6/2022 | Harada | |

FOREIGN PATENT DOCUMENTS

| | | | | |
|---|---|---|---|---|
| EP | 2156968 A1 | 2/2010 | | |
| EP | 2504179 B1 | 10/2012 | | |
| EP | 3157764 B1 | 4/2017 | | |
| EP | 3 305 555 A1 | 4/2018 | | |
| EP | 3261857 A1 | 7/2018 | | |
| EP | 3 530 488 A1 | 8/2019 | | |
| JP | 64-036506 A * | 2/1989 | | |
| JP | 05 319023 A | 12/1993 | | |
| WO | 2014118659 A1 | 8/2014 | | |
| WO | WO-2015/052122 A1 * | 4/2015 | ......... | B60C 11/0302 |
| WO | 2017092898 A1 | 6/2017 | | |
| WO | WO-2018/158022 A1 * | 9/2018 | ......... | B60C 11/0302 |
| WO | 2020012277 A1 | 1/2020 | | |
| WO | 2020012279 A1 | 1/2020 | | |
| WO | 2020217935 A1 | 10/2020 | | |

OTHER PUBLICATIONS

Machine translation for WO 2015/052122 (Year: 2025).*
Machine translation for WO 2018/158022 (Year: 2025).*
International Search Report form the European Patent Office in corresponding International Application No. PCT/IB2022/055047 mailed Sep. 6, 2022.
Written Opinion of the International Searching Authority from the European Patent Office in corresponding International Application No. PCT/IB2022/055047 mailed Sep. 6, 2022.

* cited by examiner

TYRE FOR COMMERCIAL VEHICLE WHEELS

This application is a national stage entry application under 35 U.S.C. § 371 of International Application No. PCT/IB2022/055047, filed on May 30, 2022, and claims priority to Italian Application No. 102021000014642, filed Jun. 8, 2021; the contents of each application is incorporated herein by reference in its entirety.

The present invention relates to a tyre for commercial vehicle wheels, in particular an "all season" tyre.

KNOWN ART

So-called "all season" tyres are suitable for use in both winter and summer and, due to this specific feature, which does not require the user to have two sets of dedicated tyres, each suitable for a specific season, they are highly regarded and in demand by users.

The following documents describe some examples of "all season" tyres: EP3157764, U.S. Pat. No. 7,814,951, EP2156968, U.S. Pat. No. 6,892,775, EP2504179, EP3261857.

SUMMARY OF THE INVENTION

A great deal of flexible behaviour is generally required for all-season tyres, which should make it possible to provide performance comparable to that of summer tyres in the summer and winter tyres in the winter.

The Applicant has noted that, in order to have characteristics when wet comparable with so-called winter tyres, "all season" tyres should be provided with treads characterised by a high number of grooves, compared with a common summer tyre.

The Applicant has also observed that, similarly to winter tyres, "all season" tyres can be characterised by the presence of a more or less dense siping, which, specifically during the rolling of the tyre on snow-covered roads, gives the tyre a better grip on this type of surface, thanks to the uptake of small amounts of snow inside the sipes and the greater friction produced by snow-to-snow contact.

Light duty vehicles, such as vans or commercial vehicles, are generally medium-sized vehicles, heavier than cars and/or which, in any case, are suitable for transporting even high loads.

This type of vehicle requires tyres which, despite having similar dimensions to those of passenger car tyres, are characterised by greater structural strength and a higher load index.

Generally, these characteristics confer, upon these tyres, an excellent ability to withstand heavy loads: on the other hand, the use of these tyres under load requires particular attention in controlling the uniformity of wear.

Added to this is the performance required to these tyres in terms of driveability at medium-high speeds on dry surfaces and under increasingly stringent demands on noise control.

In this regard, the Applicant has observed that, generally, in order to attempt to influence the performance of the tyres, the greatest possible amount of rubber on the ground is provided in the area of contact of the tyre with the ground (footprint area): a requirement that is clearly opposed to that of all-season-type tyres of having high number of grooves, notches and/or sipes.

In view of the above, it is clear that all-season tyres, particularly for light duty vehicles such as vans or commercial vehicles, must meet several conflicting requirements in order to provide good performance in all various road and weather conditions.

The Applicant has therefore tackled the problem of producing all-season tyres, especially for vans or commercial vehicles, capable of guaranteeing low noise, regular wear, high performance levels, braking and traction, without, at the same time, reducing drainage qualities and safe driving on wet and snowy surfaces.

In particular, the Applicant started from a directional type configuration of the tread pattern, namely, a pattern configured for tyres fitted on a vehicle in such a way as to rotate in a preferential direction of travel, as described, for example, in patent application WO 2020/012277. In said configuration, the presence of two types of grooves extending from the central region to the shoulder region of the tread is envisaged, with the formation of blocks mutually facing in pairs in the central region.

Although this tread pattern configuration is very balanced for tyres to be fitted on normal cars, for both purely winter applications and for "all-season" applications, the Applicant has verified that, on applications for light duty vehicles, which require a tyre structure suitable for higher load indexes, as well as a greater depth of the grooves, the central region of the tread has excessive longitudinal stiffness, to the detriment of regular wear.

After various studies and simulations, the Applicant has found that, by maintaining the configuration in which the central region of the tread band has a plurality of blocks facing each other in pairs, and delimited in a circumferential and/or axial direction by a first plurality of pairs of main grooves which extend with continuity to the opposite shoulder regions starting from the central region, where they are connected to each other, and furthermore providing a second plurality of pairs of main grooves, also extending from the central region towards the shoulder regions, connected to the first main grooves by means of a portion preferably tapered in width to become a thin connecting sipe, a balanced tread pattern is obtained in terms of performance on different road surfaces that is particularly suitable for applications for light duty vehicles.

Specifically, in its first aspect, the invention relates to a tyre for vehicle wheels comprising a tread band on which a first shoulder region and a second axially opposite shoulder region and a central region interposed between said first and second shoulder regions are defined.

Preferably, the tread band comprises a plurality of pairs of first blocks and second blocks, arranged in regular succession along the circumferential development of said central region. Each first block and each second block of each of said pairs are preferably at least partially aligned with each other along an axial direction defined on said tread band.

Preferably, the tread band comprises a plurality of first pairs of main grooves, arranged in regular succession along the circumferential development of said tread band to partially delimit said first and said second blocks. Each first pair of main grooves is preferably formed by a first main groove extending from said first shoulder region towards said central region and by a second main groove extending from said second shoulder region towards said central region.

Preferably, the tread band comprises a plurality of second pairs of main grooves, arranged in regular succession along the circumferential development of said tread band in an alternating position with said first pairs of main grooves. Each second pair of main grooves is preferably formed by a third main groove extending from said first shoulder region towards said central region and by a fourth main groove extending from said second shoulder region towards said central region.

Preferably, in each first pair of main grooves, said second main groove comprises an axially internal end connected with said first main groove.

Preferably, in each first pair of main grooves, said first main groove comprises a terminal segment, axially internal, connected with a second main groove circumferentially subsequent to said second main groove, so as to axially separate a first block and a second block of one of said pairs of first and second blocks.

Preferably, in each second pair of main grooves said third and said fourth main groove comprise respective axially internal ends extended by respective first sipes connected to said terminal segment of said first main groove, so as to circumferentially separate said first and said second block into respective first and second portions of block.

Preferably, a plurality of first pairs of secondary grooves is formed on said tread band, arranged in regular succession along the circumferential development of said tread band to at least partially delimit said first and said second blocks from their axially outer side. Each first pair of secondary grooves preferably comprises a first secondary groove extending from a first main groove and a second secondary groove extended from a second main groove.

The Applicant has verified that the tyre according to the invention, fitted on light duty vehicles, has very good performances on different road surfaces, together with the desired regularity of wear.

On wet surfaces, the behaviour of the tyre results to be balanced both in traction and in cornering and guarantees very good and rapid evacuation of water from the tread band. In fact, the provision of the main grooves allows for a rapid outflow of water from the central region towards the opposing shoulder regions. In particular, this action is performed by the first pairs of main grooves which, at their axially internal ends, are connected to each other and to the first pairs of successive transverse grooves. In such way a network of channels is formed in which water can be collected and conveyed to the shoulder regions.

In addition, the first pairs of main grooves are interspersed with the second pairs of main grooves, also responsible for the evacuation of water towards the shoulder regions, with a connection made only by siping, thus avoiding the excessive weakening of the central region.

In this way the main grooves are not excessively dense in the central region, which remains involved, above all, by the first pairs of main grooves, so that the first and second blocks obtained in this region have sufficiently large dimensions to offer good resistance to tangential stresses. This allows obtaining very good performance when driving on dry surfaces, as well as a very regular distribution of the tread stiffness, to the advantage of regular wear even in the case of a tyre subjected to a high load.

Lastly, the provision of a siping to subdivide the central blocks allows improving the traction and braking characteristics of the central portion when driving on a snowy surface.

These characteristics advantageously allow using the tread pattern as a basis for the manufacture of different types of tyres and, in particular, of all-season tyres.

The present invention may further exhibit one or more of the following additional preferred features.

Preferably, said first and second main grooves comprise respective first segments having a curvilinear course, extending starting from said first and said second shoulder region towards an equatorial plane of said tread band, and having a generally decreasing inclination starting from said first and said second shoulder region towards said central region. This configuration favours the evacuation of water when driving on wet ground.

Preferably, the terminal segment of said first main groove comprises a first portion extending as a continuation of the first segment of said first main groove towards said first shoulder region and a second portion extending as a continuation of said first portion towards said second shoulder region. More particularly, said first portion and said second portion of said terminal segment can preferably extend across an equatorial plane of said tread band.

Preferably, said first portion of said terminal segment of said first main groove extends over the extension of said fourth main groove. Preferably, said second portion of said terminal segment extends over the extension of said third main groove.

Preferably, said third and fourth main grooves have a curvilinear course, starting from said first and said second shoulder region towards an equatorial plane of said tread band, with a generally decreasing inclination starting from said first and said second shoulder region towards said central region. This configuration favours the evacuation of water when driving on wet surfaces. Preferably, said third and fourth main grooves have a substantially symmetrical course with respect to a circumferential direction, so as to maintain the directional configuration of the tread pattern.

Preferably, the ends of said third and fourth main grooves are tapered in width to form the sipes connected to said terminal segment of said first main groove. A gradual reduction in width advantageously allows for the reduction of the presence of abrupt variations in stiffness in the central area of the tread band, which could trigger irregular wear phenomena.

Preferably, said first and second blocks of each pair have mutually facing concavities. Preferably, said first and second blocks of each pair are axially offset. In this way, an interlock is formed between the blocks present in the central area of the tread band, so as to have an adequate stiffness for the purposes of traction and braking performance.

Preferably, at least one of said first and second block portions has a substantially quadrangular shape.

Preferably, in each of said first pairs of secondary grooves, said first secondary groove intersects a third main groove. Preferably in each of said first pairs of secondary grooves, said second secondary groove intersects a fourth main groove.

Preferably, a plurality of second pairs of secondary grooves are formed in said tread band, arranged in regular succession along the circumferential development of said tread band, each second pair of secondary grooves being formed by a third secondary groove, extended in said first shoulder region by a first main groove and by a fourth secondary groove, extended in said second shoulder region from a second main groove.

Preferably, in each of said second pairs of secondary grooves, said third secondary groove intersects a third main groove.

Preferably, in each of said second pairs of secondary grooves, said fourth secondary groove intersects a fourth main groove.

Preferably, said first and second pairs of main grooves and said first and second pairs of secondary grooves axially delimit a plurality of shoulder blocks.

Preferably, second sipes are formed on said first and second blocks, having a course substantially parallel to said first, second, third or fourth main grooves.

Preferably, third sipes are formed on said shoulder blocks having a course substantially parallel to said first, second, third or fourth main grooves.

Preferably, at least some of said first and second blocks, and/or at least some of said shoulder blocks have at least one chamfered transverse edge.

Definitions

With the term "equatorial plane" of the tyre it is meant a plane perpendicular to the axis of rotation of the tyre and which subdivides the tyre in two equal parts.

With "circumferential" direction it is meant a direction generally arranged according to the direction of rotation of the tyre, or, at most, slightly inclined with respect to the direction of rotation of the tyre.

With "axial" direction it is meant a direction substantially parallel to the axis of rotation of the tyre, or, at most, slightly inclined with respect to this axis of rotation of the tyre. The axial direction is generally perpendicular to the circumferential direction.

With the term "groove" it is meant a recess made in a portion of tread band, having a width greater than or equal to 1.5 mm and preferably with a depth greater than 3 mm.

With the term "sipe" it is meant a recess made in a portion of tread band, having a width of less than 1.5 mm, preferably less than or equal to 1 mm.

The inclination of a transverse groove with respect to a circumferential direction identified on the tread band is defined by the acute angle formed by the groove with the circumferential direction. As a particular case, a transverse groove extended parallel to the axis of the tyre will have an inclination of 90° with respect to the circumferential direction.

Two (or more) transversal grooves are inclined "in a concordant way" when their trend is, for both, increasing or decreasing, when considered on a Cartesian plane positioned on the tread band (tangential to it) with the ordinate axis parallel to the circumferential direction and the abscissa axis parallel to the axis of the tyre.

Consequently, two transverse grooves are inclined "in discordant way" when their trend is, when considered in this Cartesian plane, increasing for one groove and decreasing for the other groove.

Two grooves are "successive" to each other when they are arranged on the tread surface one after the other, considering the rotation of the tyre in either direction of rotation. In particular, two grooves of the same type are successive to each other when no other grooves of that type are provided between them.

With the term "tread pattern" it is meant the overall configuration of the tread band as defined by the set of grooves and blocks delimited by them.

A "module" of the tread pattern is defined by the minimum portion of the tread band the configuration of which is repeated in succession along the circumferential development of the tread pattern to form said tread pattern. Furthermore, whilst maintaining an identical basic configuration, the modules can have a circumferential dimension (referred to as "pitch") slightly different from each other; for example, on a tread band, it is possible to use modules with two, three or four different pitches, variously combined with each other.

A module can be formed by two or more elementary portions (or submodules), extended between the two axial ends of the tread band and arranged in the same sequence within each module.

In this case, it is envisaged that each elementary portion may have, in different modules, the same basic configuration but circumferential dimensions (i.e., "pitches") slightly different from each other, so that each module can be formed by elementary portions with different pitch. Modules having two elementary portions are also referred to as "double-pitch modules", whilst modules that do not include at least two elementary portions (or, in other words, modules that include a single sub-module coinciding with the module) are also referred to as "single-pitch modules".

BRIEF DESCRIPTION OF THE FIGURES

The features and advantages of the invention will better emerge from the detailed description of some of its preferred exemplary embodiments, illustrated by way of non-limiting example with reference to the accompanying drawings, wherein.

DETAILED DESCRIPTION OF EXAMPLES OF THE INVENTION

Figure 1:
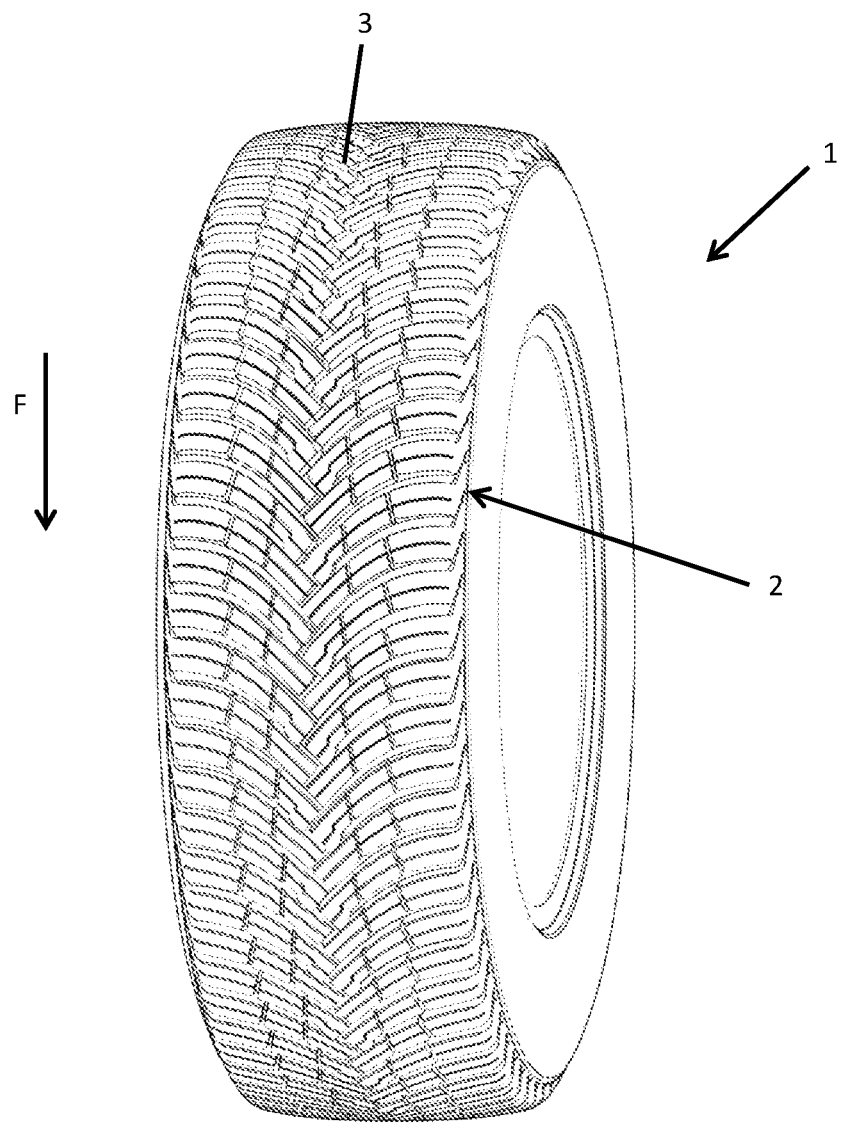
FIG. 1 is a front perspective view of a first example of a tyre for vehicle wheels made in accordance with the present invention.
Figure 2:
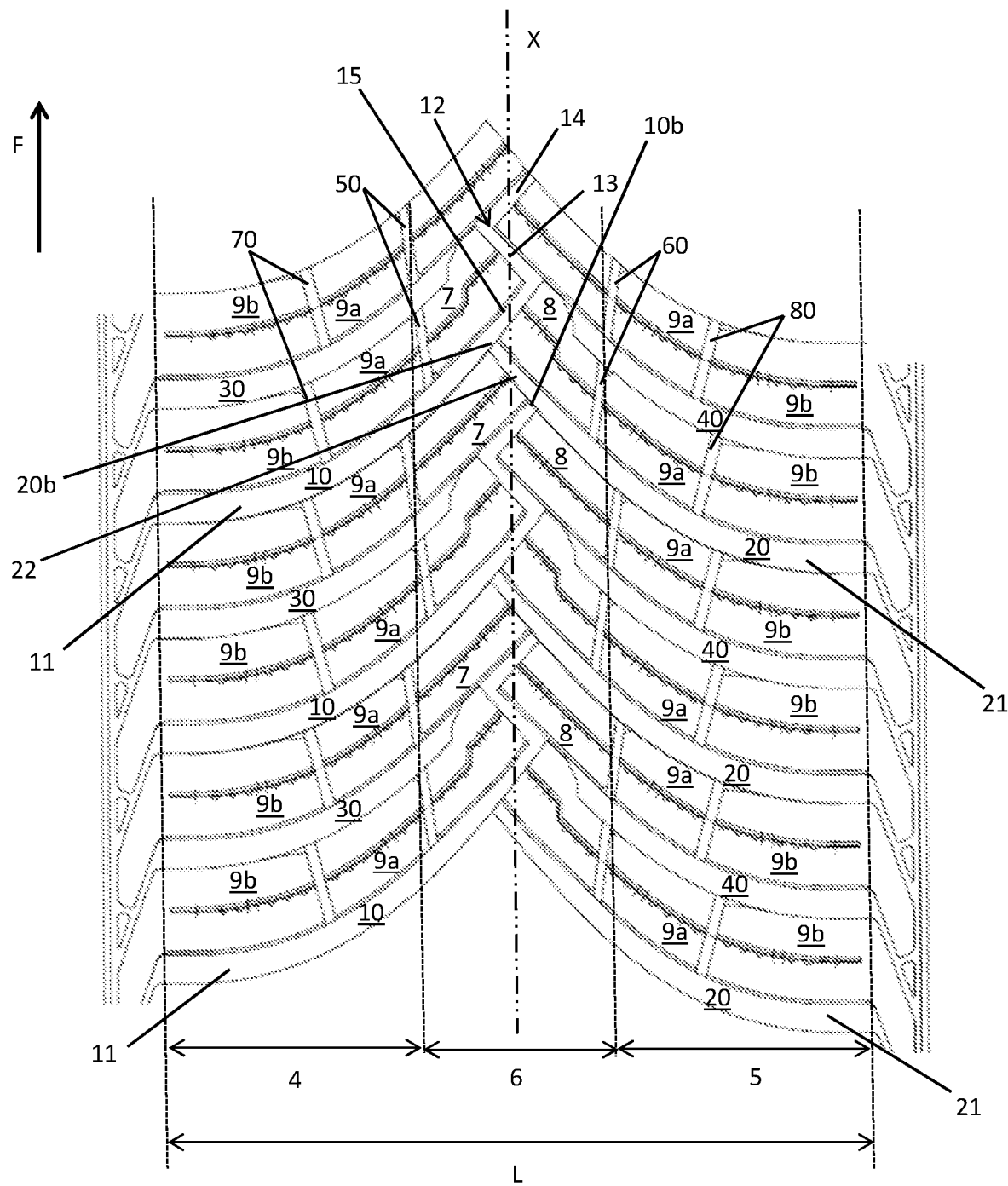
FIG. 2 is a schematic view on an enlarged scale of a significant portion of the tread band of the tyre of FIG. 1.
Figure 3:
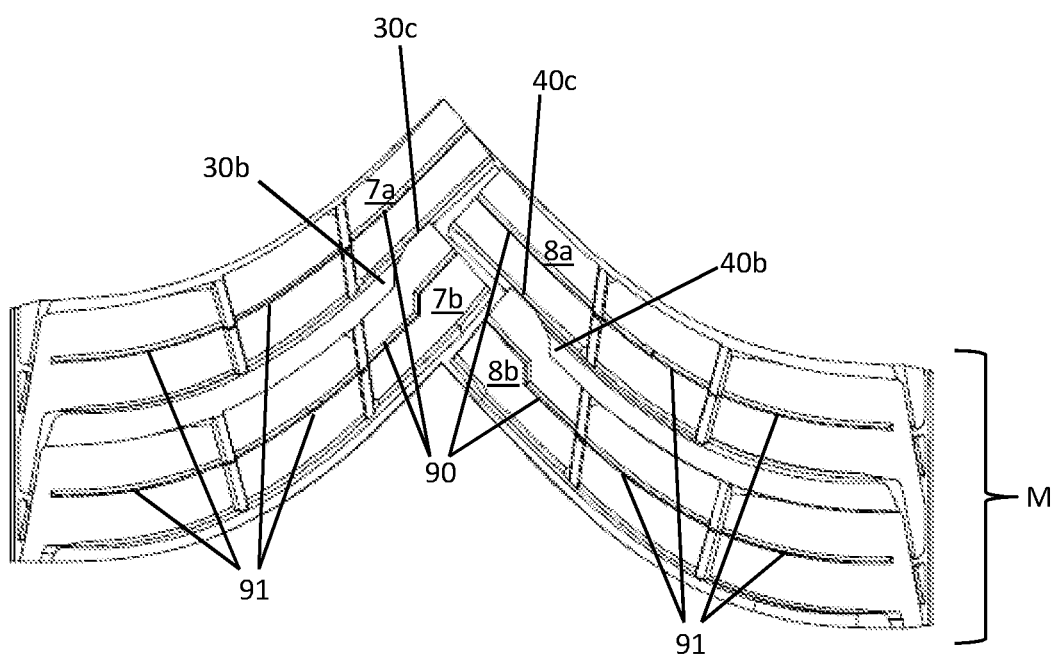
FIG. 3 is an enlarged schematic view of a single module of the tread pattern of the tyre of FIG. 1.

With reference to FIGS. 1-3, reference numeral 1 generally indicates a tyre for vehicle wheels made in accordance with the present invention.

The tyre (1) comprises a tyre structure in itself conventional, not shown in the attached figures, as well as a tread band (2) on which a tread surface (3) is defined, arranged in a position radially external to the tread band (2) and intended for contact with a road surface. The tyre (1) has a conventional generally toroidal shape developed around a rotation axis, defining, on the tread surface, 3 an axial direction parallel to it, and crossed by an equatorial plane (X), perpendicular to the axis of rotation and defining on the tread surface 3 a circumferential direction parallel to it.

On the tread band (2), an effective width (L) is identified, defined as the maximum width of the tread band intended for contact with the ground in standard use conditions (i.e., under nominal pressure and load).

The tyre (1) is a directional type tyre, in which a preferential rolling direction of the tyre is defined, indicated in the figures by the arrow (F).

On the tread band (2) a first shoulder region (4) is also defined, delimited from the axially external side by a first lateral edge of the tread band (2), a second shoulder region (5), axially opposite to the first shoulder region (4) and delimited from the axially external side by a second lateral edge of the tread band (2), as well as a central region (6), interposed between the first and second shoulder regions, (4) and (5), and extending across the equatorial plane (X).

A plurality of first pairs of main grooves are defined on the tread band (2), arranged in regular succession along the circumferential development of the tread band (2).

Each first pair of main grooves is formed by a first main groove (10), extending from the first shoulder region 4 towards the central region 6, as well as a second main groove (20) extending from the second shoulder region (5) towards the central region (6). The first and second main grooves (10), (20) of each first pair of main grooves are substantially opposed to each other with respect to the equatorial plane (X) and disposed at least partially axially side by side with each other (i.e., there is at least one straight line parallel to the axial direction that intersects both grooves).

Each first main groove (10) comprises a first segment (11), extending from a respective axially external end open in the first shoulder region 4 towards the central region (6), and a terminal segment (12), axially internal, extending as a continuation of the first segment (11) up to lead with one of its axially internal ends 10b into a second main groove (20) of a subsequent pair of first main grooves.

The first segment (11) has a curvilinear course, devoid of inflection points, with an inclination with respect to the circumferential direction generally decreasing starting from the first shoulder region (4) towards the central region (6).

Preferably, the inclination with respect to the circumferential direction of the first segment (11) of the first main grooves (10) in correspondence with the first shoulder region (4) is between 70° and 90°.

Preferably, the inclination with respect to the circumferential direction of the first segment (11) of the first main grooves (10) in correspondence with the central region (6) is between 30° and 60°.

The terminal segment (12) of each first main groove (10) has a broken line configuration and comprises a first portion (13), extending as a continuation of the first segment (11) towards the first shoulder region (4) and a second portion (14), extending as a continuation of the first portion (13) towards the second shoulder region (5).

The first portion (13) and the second portion (14) of the terminal segment (12) extend across the equatorial plane (X) of the tread band (2) and are inclined in discordant way from each other with respect to the circumferential direction.

Each second main groove (20) comprises a first segment (21), extended from a respective axially external end open in the second shoulder region (5) towards the central region (6). Similarly to the first segment (11) of the first main groove (10), the first segment (21) of the second main groove (20) also has a curvilinear course, devoid of points of inflection, with an inclination with respect to the circumferential direction generally decreasing starting from the second shoulder region (5) towards the central region (6).

Preferably, the inclination with respect to the circumferential direction of the first segment (21) of the second main grooves (20) in correspondence with the second shoulder region (5) is between 70° and 90°.

Preferably, the inclination with respect to the circumferential direction of the first segment (21) of the second main grooves (20) in correspondence with the central region (6) is between 30° and 60°.

The first segment (21) extends from an axially external end of the second main groove (20), open in the second shoulder region (5) up to an axially internal end (20b) of the second main groove (20), open on the first segment (11) of the first main groove (10).

In particular, the second main groove (20) joins the first main groove (10) shortly after crossing the equatorial plane (X).

On the first segment (11) of each first main groove (10), an internal end portion (15) remains thus defined, delimited by the end (20b) of the second main groove (20) and by the beginning of the terminal segment (12).

Furthermore, on the first segment (21) of each second main groove (20), an internal end portion (22) remains defined, delimited by the end (20b) of the second main groove (20) and from the end (10b) of the first main groove (10).

In this way, therefore, a broken, zigzag line is formed, defined by the internal end portion (22) of the second main groove (20), by the internal end portion (15) of the first main groove (10), from the first portion (13) of the terminal segment (12), from the second portion (14) of the terminal segment (12). This broken line develops continuously along the entire circumferential extension of the equatorial plane (X) and, preferably, crosses it in each of its subsequent sections.

The first and second main grooves, (10) and (20), of each first pair of main grooves have generally similar trends, with a significant part of the respective first segments, (11) and (21), substantially symmetrical with respect to the equatorial plane (X) and with concavities facing the same side of the band tread.

The second main groove (20), however, is axially offset with respect to the first transverse groove (10). For example, the respective axially external ends of the first and second main grooves (10), (20) can be offset by a measure comprised between 5 and 20 mm, preferably between 10 and 20 mm, measured along the circumferential direction.

By the misalignment between the axially external ends of the first and second main grooves (10), (20) it is possible to contribute to the reduction of the noise emitted during the rolling of the tyre (1), optimising the entry into the footprint of the relative edges.

On the tread band (2), there is also defined a plurality of second pairs of main grooves, arranged in regular succession along the circumferential development of the tread band (2), in alternating position with the first pairs of main grooves, (10) and (20).

Each second pair is formed by a third main groove (30), extending from the first shoulder region (4) towards the central region (6) and by a fourth main groove (40), extending from the second shoulder region (5) towards the central region (6). The third and fourth main grooves (30), (40) of each second pair of main grooves are opposite each other with respect to the equatorial plane (X) and at least partially axially disposed side by side with each other (i.e., there is at least one straight line parallel to the axial direction that intersects both grooves).

Preferably, the inclination with respect to the circumferential direction of the third and fourth main grooves 30, 40 in correspondence with the first/second shoulder region (4), (5) is between 70° and 90°.

Preferably, the inclination with respect to the circumferential direction of the third and fourth main grooves (30), (40) in correspondence with the central region 6 is between 30° and 60°.

In particular, each third main groove (30) extends between an axially external end open in the first shoulder region (4) and an axially internal end (30b).

Similarly, each fourth main groove (40) extends between an axially external end open in the second shoulder region (5) and an axially internal end (40b).

The third and fourth main grooves, (30) and (40), have a curvilinear trend analogous and substantially parallel to the first and second main grooves, (10) and (20), respectively.

Furthermore, the third and fourth main grooves, (30) and (40), have a substantially symmetrical course with respect to the equatorial plane (X), even though they are axially offset from each other. In particular, the respective axial ends of the third and fourth main grooves (30), (40) can be offset by a measure comprised between 5 and 20 mm, preferably between 10 and 20 mm, measured along the circumferential direction. By misaligning the axially outer ends of the third and fourth main grooves 30, 40 it is possible to contribute to reducing the noise emitted during the rolling of tyre (1), optimising the entry into the footprint of the relative edges.

Advantageously, the first portion (13) of the terminal segment (12) of the first main groove (10) is located on the theoretical extension of the fourth main groove (40). More specifically, the axially internal end (40b) of the fourth main groove (40) is extended by a respective sipe (40c), which connects the end (40b) to the first portion (13) of the terminal segment (12) of the first main groove (10). Preferably, the width of the sipe (40c) is less than or equal to 1 mm. The extension of the axially internal end (40b) of the fourth main groove (40) in the respective sipe (40c) can take place by means of a groove portion tapered in width, so as to take place in a gradual manner.

Similarly, the second portion (14) of the terminal segment (12) of the first main groove (10) is located on the theoretical extension of the third main groove (30). More particularly, the axially internal end (30b) of the third main groove (30) is extended by a respective sipe (30c), which connects the end (30b) to the second portion (14) of the terminal segment (12) of the first main groove (10). Preferably, the width of the sipe (30c) is less than or equal to 1 mm. The extension of the axially internal end (30b) of the third main groove (30) in the respective sipe (30c) can take place by means of a groove portion tapered in width, so as to take place in a gradual manner.

All of the first, second, third and fourth main grooves, (10), (20), (30) and (40), can have a maximum depth of at least 7 mm, preferably of at least 8 mm. Preferably, the sipes (30c), (40c) have a maximum depth that is less than the maximum depth of the first, second, third and fourth main grooves, (10), (20), (30), (40).

All of the first, second, third and fourth main grooves, (10), (20), (30) and (40), can have variable width, decreasing starting from the shoulder regions (4), (5) towards the central region (6).

For example, the width of said main grooves can vary from about 9-12 mm in correspondence of the respective shoulder region (4), (5) up to a measure of approximately 2.5-5 mm in correspondence of the central region (6).

Furthermore, on the tread band (2), there is a plurality of first pairs of secondary grooves (50), (60) arranged in regular succession along the circumferential development of the tread band (2).

Each first pair of secondary grooves is formed by a first secondary groove (50), extended from a respective first main groove (10), preferably between two first main grooves (10) which are successive to each other, and by a second secondary groove (60) extended from a second main groove (20), preferably between two second main grooves (20) which are subsequent to each other.

More particularly, each first secondary groove (50) intersects a third main groove (30) in correspondence with an axially internal end region thereof, close to its end (30b). In this way, each first secondary groove 50 can be divided into a first portion, extending between a first main groove (10) and a third main groove (30) and a second portion extending between the third main groove (30) and a first subsequent main groove (10).

The first and second portions of each first secondary groove (50) can be mutually aligned (although not necessarily) along a substantially rectilinear direction.

Each first secondary groove (50) preferably extends according to a direction inclined with respect to the circumferential direction of an angle less than or equal to 30°, in a discordant way with respect to the inclination of the first segments (11) of the first main grooves (10) that it intersects.

Preferably, each first secondary groove 50 has a maximum width smaller than the maximum width of the first main grooves (10). For example, each first secondary groove (50) can have a width (possibly variable along its extension) comprised between 2 mm and 5 mm.

The second secondary grooves (60) are substantially mirrored to the first secondary grooves (50) with respect to the equatorial plane (X).

More particularly, each second secondary groove (60) intersects a fourth main groove (40) at an axially internal end region thereof, close to its end (40b). In this way, each second secondary groove (60) can be subdivided into a first portion, extending between a second main groove (20) and a fourth main groove (40), and a second portion extending between the fourth main groove (40) and a subsequent second main groove (20). The first and second portions of each second secondary groove (60) can be mutually aligned (although not necessarily) along a substantially rectilinear direction.

Each second secondary groove (60) preferably extends according to a direction inclined with respect to the circumferential direction by an angle less than or equal to 30°, in a discordant way with respect to the inclination of the first segments (21) of the second main grooves (20) that it intersects.

Preferably, each second secondary groove (60) has a maximum width smaller than the maximum width of the second main grooves (20). For example, each second secondary groove 60 can have a width (possibly variable along its extension) comprised between 2 mm and 5 mm.

The first pairs of secondary grooves (50), (60) can axially delimit the central region (6) of the tread band (2).

Along the circumferential development of the central region (6), the first, second, third and fourth main grooves, (10), (20), (30), (40), as well as the first pairs of secondary grooves (50), (60) form a plurality of pairs of first blocks (7) and second blocks (8) arranged in regular succession. For each pair, a first block (7) and a second block (8) are at least partially aligned with each other along the axial direction. In other words, the respective projections along the axial direction of the first and second block (7), (8) of each pair of blocks result in a partial overlap.

In particular, the first block (7) and the second block (8) have respective concavities facing each other, said cavities being formed by the broken line, zigzagging, defined by the internal end portion (22) of the second main groove (20), by the inner end portion (15) of the first main groove (10), by the first portion (13) of the terminal segment (12) of the first main groove (10), by the second portion (14) of the terminal segment (12) of the first main groove (10).

The first and second blocks, (7), (8), are also axially offset, so that a portion of the first block (7) can be at least partially received in the concavity of the corresponding second block (8) and a portion of the second block 8 can be at least partially received in the concavity of the corresponding first block (7).

In this way, the first and second blocks, (7) and (8), of each pair are partially interlocked with each other.

More particularly, the third and fourth main grooves (30), (40) end within the first and second blocks (7), (8) with their axially internal ends (30b), (40b). Furthermore, by extending the ends (30b), (40b) by means of the respective first sipes (30c), (40c), a connection is made with the terminal segment (12) of each first main groove (10), so as to circumferentially separate the first and said second block (7), (8) into respective first portions of block (7a), (8a) and second portions of block (7b), (8b). The first portions of block (7*a*), (8*a*) preferably have a substantially quadrangular shape. Also the second portions of block (7*b*), (8*b*) can have a substantially quadrangular shape, but for a protruding portion thereof formed by the ends (30*b*), (40*b*) tapered in width.

Furthermore, on the tread band (2), a plurality of second pairs of secondary grooves (70), (80) are arranged in regular succession along the circumferential development of the tread band (2).

Each second pair of secondary grooves is formed by a third secondary groove (70), extending into the first shoulder region (4) from a respective first main groove (10) and by a fourth secondary groove (80) extending into the second shoulder region (5) from a respective second main groove (20).

Preferably, two third secondary grooves (70) extend into the first shoulder region (4) starting from two first main grooves (10) subsequent to each other. Preferably (although not necessarily), these two third secondary grooves (70) can be arranged in a way not aligned with each other, for example along directions substantially parallel to each other.

More particularly, each third secondary groove (70) intersects a third main groove (30) at an intermediate portion thereof.

Each third secondary groove (70) extends preferably according to a direction inclined with respect to the circumferential direction by an angle less than or equal to 40°, in a discordant way with respect to the inclination of the first segments (11) of the first main grooves (10) from which it departs.

Preferably, each third secondary groove (70) has a maximum width less than the maximum width of the first main grooves (10). Preferably, each third secondary groove (70) has a maximum width greater than the maximum width of the first secondary grooves (50). For example, each third secondary groove (70) can have a width (possibly variable along its extension) comprised between 3 mm and 5 mm.

The fourth secondary grooves (80) are substantially mirrored to the third secondary grooves (70) with respect to the equatorial plane (X).

Preferably, two fourth secondary grooves (80) extend into the second shoulder region (5) starting from two second main grooves (20) subsequent to each other. Preferably (although not necessarily), these two fourth secondary grooves (80) can be arranged in a way not aligned with each other, for example, along directions that are substantially parallel to each other.

More specifically, each fourth secondary groove 80 intersects a fourth main groove (40) at an intermediate portion thereof.

Each fourth secondary groove (80) preferably extends in direction inclined with respect to the circumferential direction of an angle of less than or equal to 40°, in a discordant way with respect to the inclination of the first segments (21) of the second main grooves (20) from which it departs.

Preferably, each fourth secondary groove (80) has a maximum width smaller than the maximum width of the second main grooves (20). Preferably, each fourth secondary groove (80) has a maximum width greater than the maximum width of the second secondary grooves (60). For example, each fourth secondary groove (80) can have a width (possibly variable along its extension) comprised between 3 mm and 5 mm.

By means of the plurality of second pairs of secondary grooves, (70), (80), on the shoulder regions (4), (5) of the tread band (2), in addition to the first and second blocks (7) and (8), shoulder blocks 9*a* and 9*b* remain defined.

The shoulder blocks (9*a*) are delimited by the first and second pairs of main grooves (10, 30 or 20, 40) as well as by the first and second pairs of secondary grooves (50, 70 or 60, 80).

The shoulder blocks (9*b*) are delimited by the first and second pairs of main grooves (10, 30 or 20 and 40), by the second pairs of secondary grooves (70 or 80) and by the lateral edges of the tread band.

On the blocks indicated above sipes are preferably formed, which favour the performance of the tyre in snowy conditions.

In particular, on the first and second blocks (7 and 8) (preferably on each of the portions of block (7*a*, 7*b*, 8*a*, 8*b*)) second sipes (90) are formed, which have a course substantially parallel to said first, second, third or fourth main grooves (10), (20), (30), (40). In the embodiment shown in the figures, on the first portions of block (7*a*), (8*a*) the second sipes (90) have a course substantially parallel to the first and second main grooves (10), (20), whilst on the second portions of block (7*b*), (8*b*) the second sipes (90) have a trend substantially parallel to the third and fourth main grooves (30), (40), with a respective deviation which follows the tapered portion of the ends (30*b*), (40*b*).

Third sipes (91) are also formed on the shoulder blocks (9*a*), (9*b*), which have a trend substantially parallel to said first, second, third or fourth main grooves (10), (20), (30), (40).

The second and/or third sipes (90), (91) can have variable depth along their extension. Furthermore, they can have a three-dimensional conformation, i.e. they cause, in the walls of the blocks on which they are formed, the formation of protrusions and corresponding recesses. In one preferred embodiment, the second and/or third sipes (90), (91) form protrusions (and corresponding recesses) having a substantially pyramidal conformation, comprising an apex connected to an extension plane of the respective sipe by means of substantially flat connecting surfaces, as described, for example, in patent application WO 2017/212399 in the name of said Applicant. Even more preferably, in each second and/or third sipe (90), (91) these projections all face in the opposite direction with respect to the preferential rolling direction (F) of the tyre (1).

Preferably, at least some of the first and second blocks (7), (8) and/or at least some of said shoulder blocks (9*a*), (9*b*) have at least one chamfered transverse edge. In the embodiment shown in the figures, the block portions (7*a*), (8*a*), (7*b*), (8*b*), as well as the shoulder blocks (9*a*), (9*b*) have a chamfered portion on their respective edge arranged in the opposite direction to the preferential rolling direction of the tyre (1) indicated by the arrow (F). Preferably, the second and/or third sipes (90), (91) can also have at least one chamfered transverse edge.

The tread pattern results formed by the repetition in continuous succession of a single module (M) formed by the portion of the tread band comprised between two subsequent first pairs of main grooves (10) and (20), as better shown in FIG. 3.

Each module (M), in turn, is formed by a first elementary portion, extended from a first pair of main grooves (10) and (20) up to the second pair of main grooves (30) and (40) and by a second elementary portion, extended from the second pair of main grooves (30) and (40) up to the subsequent first pair of main grooves (10) and (20).

Each first elementary portion and each second elementary portion can have a circumferential dimension corresponding to a long pitch, or of a measure corresponding to a short pitch, smaller than the long pitch.

Each module (M) can be formed by a first and a second elementary portion with a short pitch or a long pitch variously combined with each other, so that on the tread pattern modules are provided having both the first and the second elementary portion with a long pitch, or modules having both the first and the second elementary portion with a short pitch, or modules with the first elementary portion with a short pitch and the second elementary portion with a long pitch, or, lastly, modules with the first elementary portion with a long pitch and the second elementary portion with a short pitch.

The invention claimed is:

1. A tyre for vehicle wheels comprising a tread band, wherein the tread band comprises:
   a first shoulder region and a second shoulder region axially opposite each other;
   a central region interposed between the first region and the second shoulder region;
   a plurality of pairs of first blocks and second blocks, arranged in regular succession along a circumferential development of the central region, wherein each first block and each second block of each of the pairs is at least partially aligned with each other along an axial direction defined on the tread band,
   a plurality of first pairs of main grooves, arranged in regular succession along the circumferential development of the tread band to partially delimit the first and the second blocks, wherein each first pair of main grooves are formed by a first main groove extending from the first shoulder region towards the central region and by a second main groove extending from the second shoulder region towards the central region,
   a plurality of second pairs of main grooves, arranged in regular succession along the circumferential development of the tread band in an alternating position with the first pairs of main grooves, wherein each second pair of main grooves are formed by a third main groove extending from the first shoulder region towards the central region and by a fourth main groove extending from the second shoulder region towards the central region,
   wherein in each first pair of main grooves, the second main groove comprises an axially internal end connected with the first main groove;
   wherein in each first pair of main grooves, the first main groove comprises an terminal segment, axially internal, connected with a second main groove circumferentially subsequent to the second main groove, to axially separate a first block and a second block of one of the pairs of first and second blocks; and
   wherein in each second pair of main grooves, the third and the fourth main groove comprise respective axially internal ends, and the axially internal ends are extended by respective first sipes and connected to the terminal segment of the first main groove to circumferentially separate the first and the second block into respective first and second portions of block, and in which a plurality of first pairs of secondary grooves are formed on the tread band, arranged in regular succession along the circumferential development of the tread band to at least partially delimit the first and the second blocks from their axially outer side, and each first pair of secondary grooves comprising a first secondary groove extending from a first main groove and a second secondary groove extended from a second main groove.

2. The tyre according to claim 1, wherein the first and second main groove comprise respective first segments having a curvilinear course, extending starting from the first and the second shoulder region towards an equatorial plane (X) of the tread band, and having a generally decreasing inclination starting from the first and the second shoulder region towards the central region.

3. The tyre according to claim 2, wherein the terminal segment of the first main groove comprises a first portion extending as a continuation of the first segment of the first main groove towards the first shoulder region, and a second portion extending as a continuation of the first portion towards the second shoulder region.

4. The tyre according to claim 3, wherein the first portion and the second portion of the terminal segment extend across an equatorial plane (X) of the tread band.

5. The tyre according to claim 3, wherein the first portion of the terminal segment extends over the extension of the fourth main groove.

6. The tyre according to claim 3, wherein the second portion of the terminal segment extends over the extension of the third main groove.

7. The tyre according to claim 1, wherein the third and fourth main grooves have a curvilinear course, starting from the first and the second shoulder region towards an equatorial plane (X) of the tread band, with a generally decreasing inclination starting from the first and the second shoulder region towards the central region.

8. The tyre according to claim 1, wherein the third and fourth main grooves have a substantially symmetrical course with respect to a circumferential direction.

9. The tyre according to claim 1, wherein the ends of the third and fourth main grooves are tapered in width to form the first sipes connected to the terminal segment of the first main groove.

10. The tyre according to claim 1, wherein the first and second blocks of each pair have mutually facing concavities.

11. The tyre according to claim 1, wherein the first and second blocks of each pair are axially offset.

12. The tyre according to claim 1, wherein at least one of the first and second block portions has a substantially quadrangular shape.

13. The tyre according to claim 1, wherein in each of the first pairs of secondary grooves, the first secondary groove intersects a third main groove, and the second secondary groove intersects a fourth main groove.

14. The tyre according to claim 1, wherein a plurality of second pairs of secondary grooves are formed in the tread band, and arranged in regular succession along the circumferential development of the tread band, wherein each second pair of secondary grooves are formed by a third secondary groove, extended in the first shoulder region from a first main groove, and by a fourth secondary groove, extended in the second shoulder region from a second main groove.

15. The tyre according to claim 14, wherein in each of the second pairs of secondary grooves, the third secondary groove intersects a third main groove, and the fourth secondary groove intersects a fourth main groove.

16. The tyre according to claim 14, wherein the first and second pairs of main grooves and the first and second pairs of secondary grooves axially delimit a plurality of shoulder blocks.

17. The tyre according to claim 1, wherein second sipes are formed on the first and second blocks having a course substantially parallel to the first, second, third or fourth main grooves.

18. The tyre according to claim 17, wherein third sipes are formed on the shoulder blocks having a course substantially parallel to the first, second, third or fourth main grooves.

19. The tyre according to claim 16, wherein at least some of the first and second blocks, at least some of the shoulder blocks, or both have at least one chamfered transverse edge.

* * * * *